United States Patent
Chen et al.

(10) Patent No.: US 6,876,804 B2
(45) Date of Patent: Apr. 5, 2005

(54) METHOD OF MAKING A SPUN OPTICAL FIBER WITH LOW POLARIZATION MODE DISPERSION

(75) Inventors: Xin Chen, Corning, NY (US); Ming-Jun Li, Horseheads, NY (US); Jesse C. Meyer, Wilmington, NC (US); Oscar Palmer, Leland, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/392,652

(22) Filed: Mar. 20, 2003

(65) Prior Publication Data

US 2004/0184751 A1 Sep. 23, 2004

(51) Int. Cl.$^7$ .................. C03B 37/02; C03B 37/022; C03B 37/075
(52) U.S. Cl. ............ 385/123; 65/402; 65/377; 65/381; 65/504
(58) Field of Search .......... 65/432, 438, 402, 65/377, 381, 504, 378; 385/27, 28, 123, 124, 100, 104

(56) References Cited

U.S. PATENT DOCUMENTS

| | | | |
|---|---|---|---|
| 4,943,132 A | * 7/1990 | Huang | 385/11 |
| 5,298,047 A | 3/1994 | Hart, Jr. et al. | 65/3.11 |
| 5,320,658 A | 6/1994 | Ohga et al. | 65/3.11 |
| 5,418,881 A | * 5/1995 | Hart et al. | 385/123 |
| 5,676,725 A | 10/1997 | Ito et al. | 65/382 |
| 5,704,960 A | 1/1998 | Evans et al. | 65/402 |
| 5,802,235 A | 9/1998 | Akasaka | 385/123 |
| 5,822,487 A | * 10/1998 | Evans et al. | 385/123 |
| 5,897,680 A | 4/1999 | Geertman | 65/402 |
| 5,943,466 A | 8/1999 | Henderson et al. | 385/123 |
| 5,992,181 A | 11/1999 | Geertman | 65/392 |
| 6,055,830 A | 5/2000 | Do | 65/412 |
| 6,189,343 B1 | 2/2001 | Cocchini et al. | |
| 6,240,748 B1 | * 6/2001 | Henderson et al. | 65/402 |
| 6,324,872 B1 | 12/2001 | Blaszyk et al. | 65/504 |
| 2002/0162359 A1 | * 11/2002 | Tennent et al. | 65/391 |
| 2002/0172485 A1 | * 11/2002 | Keaton et al. | 385/127 |
| 2002/0178758 A1 | * 12/2002 | Cocchini et al. | 65/378 |
| 2003/0152348 A1 | * 8/2003 | Chen et al. | 385/123 |
| 2003/0215201 A1 | * 11/2003 | Tanigawa et al. | 385/123 |
| 2003/0215202 A1 | * 11/2003 | Tanigawa et al. | 385/123 |
| 2004/0017986 A1 | * 1/2004 | Garner et al. | 385/123 |
| 2004/0022507 A1 | * 2/2004 | Galtarossa et al. | 385/123 |
| 2004/0081412 A1 | * 4/2004 | Cocchini et al. | 385/104 |

FOREIGN PATENT DOCUMENTS

| | | | |
|---|---|---|---|
| EP | 0 582 405 A1 | 2/1994 | C03B/37/027 |
| EP | 0 582 405 B1 | 2/2000 | C03B/37/027 |
| WO | WO 96/23739 | 8/1996 | C03B/37/027 |
| WO | WO 97/07067 | 2/1997 | C03B/37/027 |
| WO | WO 99/67180 | 12/1999 | C03B/37/03 |
| WO | WO 02/03115 | 1/2002 | G02B/6/16 |

OTHER PUBLICATIONS

C.G. Askins et al, "Technique for Controlling the Internal Rotation of Principal Axes in the Fabrication of Birefringent Fibers". Journal of Lightwave Technology. vol. 6. No. 9. Sep. 1988. pp. 1402–1405.

N. Uchida, "Development and Future Prospect of Optical Fiber Technologies", IEICE Transactions on Electronics on Electronics, vol. E85–C, No. 4, Apr. 2002, pp. 868–880.

* cited by examiner

*Primary Examiner*—Karl D. Frech
*Assistant Examiner*—Daniel Walsh
(74) *Attorney, Agent, or Firm*—Robert L. Carlson

(57) ABSTRACT

An optical fiber, and a method of making such optical fiber, wherein the optical fiber exhibits a beatlength greater than about 5 meters, and the fiber is spun to provide a polarization mode dispersion in the spun state of said fiber which is less than 0.05 ps/km$^{1/2}$. The fiber is spun by employing a spin having a spin repeat distance of at least 10 meters. The spin preferably alternates between clockwise and counterclockwise directions.

9 Claims, 6 Drawing Sheets

METHOD OF MAKING A SPUN OPTICAL FIBER WITH LOW POLARIZATION MODE DISPERSION

BACKGROUND OF THE INVENTION

1. Field of the Invention

The invention relates to a method of manufacturing an optical fiber, whereby a fiber is drawn from a molten extremity of a preform and is subsequently subjected to a torque, thereby causing a portion of the fiber to be twisted about its longitudinal axis and to be endowed with a spin. More particularly, the invention relates to an optical fiber of this type having low polarization mode dispersion.

2. Technical Background

Light traveling in an optical fiber has two polarization modes. For optical fibers that are perfectly circularly symmetric in both geometry and internal and applied stress, operation at a wavelength or in a wavelength range which is regarded as "single-moded" actually supports two orthogonal polarization modes, wherein the two polarization modes are degenerate, propagate with the same group velocity and have no time delay after traveling the same distance in the fiber. However, in practice, optical fibers are not perfectly circularly symmetric. For example, imperfections such as geometric and form deformation and stress asymmetry break the degeneracy of the two modes. See, for example, Rashleigh, S.C. , Journal of Lightwave Technology, LT-1:312–331, 1983. As a result, the two polarization modes propagate with different propagation constants $\beta_1$ and $\beta_2$. The difference between the propagation constants is termed birefringence $\delta\beta$, the magnitude of the birefringence being given by the difference in the propagation constants of the two orthogonal modes:

$$\delta\beta = \beta_1 - \beta_2 \qquad (1)$$

Birefringence causes the polarization state of light propagating in the fiber to evolve periodically along the length of the fiber. The distance required for the polarization to return to its original state is the fiber beat length $L_B$, which is inversely proportional to the fiber birefringence. In particular, the beat length $L_B$ is given by:

$$L_B = \frac{2\pi}{\delta\beta} \qquad (2)$$

Accordingly, fibers with more birefringence have shorter beat lengths and vice versa. Commercial fibers exhibit a wide variety of beat lengths since the geometric and stress asymmetries of such fibers vary along the length of the fiber and between different fibers. Typical beat lengths observed in practice range from as short as 2–3 millimeters (a high birefringence fiber) to as long as 10–100 meters (a low birefringence fiber).

In addition to causing periodic changes in the polarization state of light traveling in a fiber, the presence of birefringence means that the two polarization modes travel at different group velocities, the difference increasing as the birefringence increases. The differential time delay between the two polarization modes is called polarization mode dispersion, or PMD. PMD causes signal distortion, and thus PMD is very detrimental in high bit rate systems and analog communication systems. For a uniform linear birefringent fiber without perturbation, i.e. externally imposed perturbation, the PMD of the fiber increases linearly as the fiber length increases. However, in a longer length, random mode coupling is inevitably introduced into the fiber due to externally imposed perturbations, and statistically the PMD increase along the fiber is thus proportional to the square-root of the fiber length.

A known method of combating PMD is to deliberately spin the warm fiber as it is drawn from the preform, so that a mechanical spin becomes "frozen" into the fiber as it cools. The resulting rotation of the birefringence axis in the fiber produces continual mode-coupling between the orthogonal polarization modes of a carried signal, thereby inhibiting the accumulation of a significant phase lag between the two modes, and consequently causing a significant reduction in the fiber's PMD.

A method as specified in the opening paragraph is known from U.S. Pat. No. 6,324,872, wherein the drawn fiber is caused to pass over a roller whose rotational axis can be canted, so that the pulley can be caused to rock back and forth about an axis perpendicular to its rotational axis. The rocking motion of the roller produces a twist in the fiber along a substantial portion of its length. In particular, portions of warm fiber which are twisted in this manner will become endowed with a permanent twist (spin) as their constituent material subsequently cools.

The cited document stipulates that the spin imparted to the fiber ideally has a non-constant spatial frequency. This can be achieved by canting the pulley back and forth in a non-periodic manner. In this way, the described method aims to achieve a PMD of less than 0.5 ps/km$^{1/2}$.

However, the known methods for spinning optical fiber to reduce PMD have some deficiencies. For example, the quality with which optical fiber is being manufactured today is becoming increasingly improved. Consequently, even unspun fiber now has the capability of exhibiting a PMD less than 0.1 ps/km. Unfortunately, prior art spinning methods have not been completely successful in reducing this already low level of PMD which is existent in some of today's manufactured single mode fibers to even lower levels.

SUMMARY OF THE INVENTION

The present invention relates to a novel and convenient method for making optical fiber, that can be used to produce fiber having low PMD, for example on the order of less than 0.05 ps/km$^{1/2}$, more preferably less than 0.03 ps/km$^{1/2}$, even more preferably less than 0.02 ps/km$^{1/2}$, and most preferably less than 0.01 ps/km$^{1/2}$. More specifically, the inventive method comprises providing a conventional optical fiber preform, heating at least a portion of the preform to a conventional draw temperature, and drawing optical fiber from the heated preform in such a way that a spin is impressed on the fiber. In other words, a torque is applied to the fiber such that the fiber is caused to twist around its longitudinal axis with a resulting torsional deformation of the fiber material in the hot zone. A spin is "impressed" on the fiber herein if fiber material in the hot zone is caused to be torsionally deformed, with that deformation being frozen into the fiber, such that the fiber exhibits a permanent "spin", i.e. a permanent torsional deformation.

Applicants have discovered that, for single mode optical fibers having a PMD less than 0.1 ps/km$^{1/2}$ in the unspun state, it is desirable to spin the fiber so that the period or spin repeat distance of the twist, i.e. the distance required to alternate the direction of the spin back and forth, is greater than 10 meters, more preferably greater than 20 meters, and most preferably greater than 30 meters. For example, for step-index single mode fibers (for example, those having a dispersion slope of about 0.06 ps/nm$^2$/km and a dispersion at 1550 nm from about 16 to 20 ps/nm/km), such fibers exhibit a beatlength now commonly on the order of greater than about 30 meters.

While in some preferred embodiments of the invention, the peak fiber spin rate is greater than 1.5 revolutions per meter, and more preferably between about 1.2 and 4 revolutions per meter, the invention is not limited to such fiber spin rates, and spin rates of greater than 4 spins per meter and less than 1.2 spins per meter can also be employed successfully.

The PMD level in the unspun optical fiber is related to the beat length in that fiber, and generally speaking, the PMD of less about 0.1 ps/km$^{1/2}$ is equivalent to a beat length of approximately 5 meters for fibers having a typical mode coupling length of about 10 meters. Consequently, the methods of the present invention are especially applicable to single mode fibers having a beat length greater than 5 meters. Likewise, the methods of the present invention are applicable to single mode fibers having a beat length greater than 10 meters and even greater than 20 or 50 meters. Similarly, the methods of the present invention are applicable to single mode fibers having a PMD less than 0.05 ps/km$^{1/2}$ in the unspun state.

Utilizing the methods of the present invention, a number of advantages can be achieved over the prior art. The method is especially valuable for imparting a low PMD to optical fibers which are single-moded at wavelengths ranging from 1300 to 1625, and most preferably at around 1550 nm. Consequently, the invention is also embodied in a novel type of low PMD single mode fiber, and in articles (e.g. an optical fiber communications systems) that comprise such fiber. For example, previously unheard of low levels of PMD can be routinely and consistently achieved on a long beat length (greater than 5 meters, more preferably greater than 10 meters) single mode fibers. For example, PMD as low as 0.05, more preferably less than 0.03, even more preferably less than 0.02, and most preferably less than 0.01 ps/km$^{1/2}$ on the fiber in the spun state, can be achieved, on such fibers using the methods disclosed herein.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE INVENTION

To describe the PMD reduction, we define a parameter called PMD reduction factor which is the ratio of the PMD of spun fiber ($\tau$) to that of the same fiber in the unspun state ($\tau_0$): PMDRF=$\tau/\tau_0$. For example, if PMDRF is 1.0, there is no improvement in fiber while a PMDRF of 0.2 implies that the PMD has been improved by a factor of 5.

Figure 1:
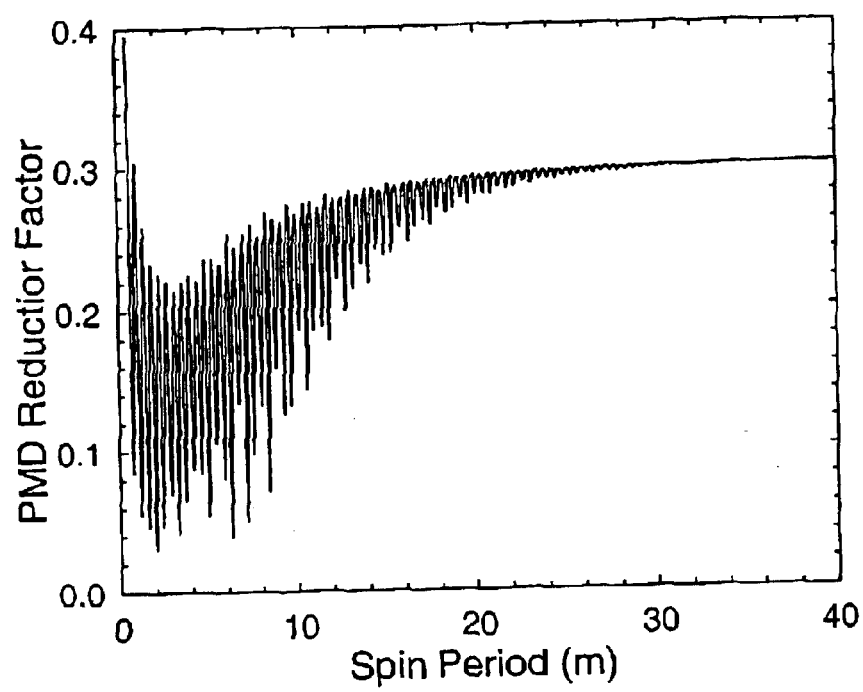
FIG. 1 illustrates the effect on PMD reduction factor that different spin periods have on a fiber having a beat length of about 1 meter at a spin magnitude of 2.5 revolutions/m.
Figure 2:
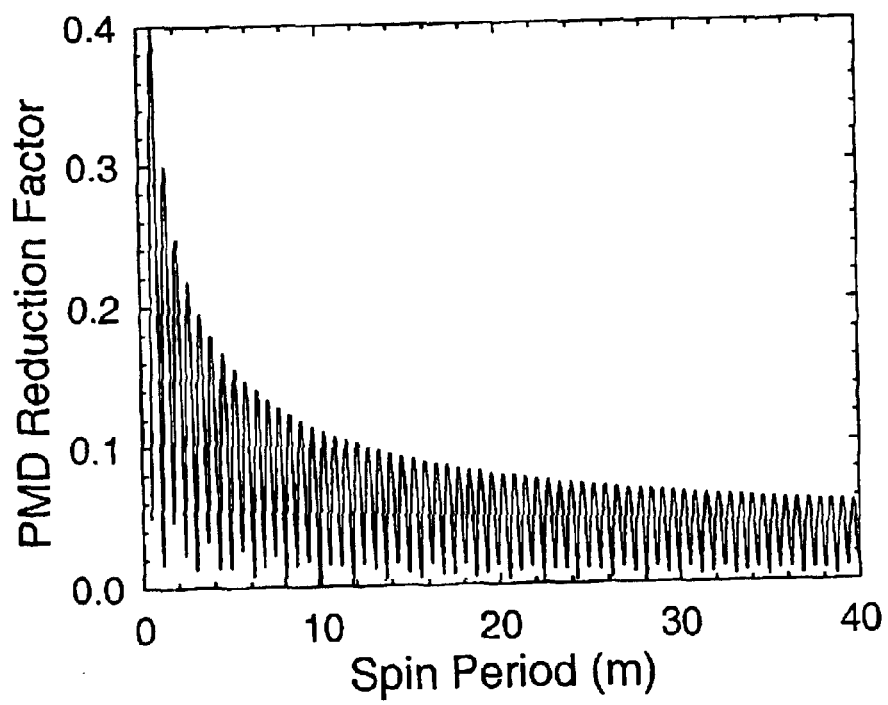
FIG. 2 illustrates the effect on PMD reduction factor that different spin periods have on a fiber having a beat length of about 10 meters at a spin magnitude of 2.5 revolutions/m.
Figure 3:
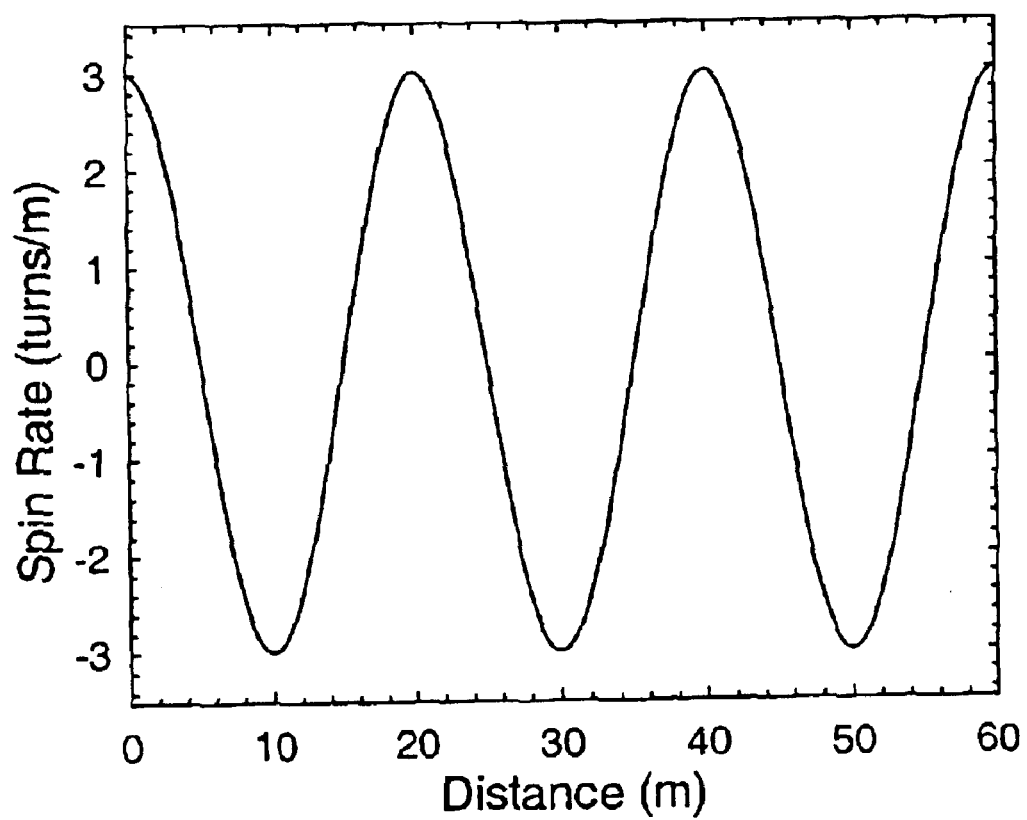
FIG. 3 illustrates the spin rate as a function of distance for a sinusoidal spin profile having a spin magnitude of 3.0 revolutions/m, and a spin period of 20.0 m.

Applicants have discovered that, PMD reduction performance is strongly related to fiber beatlength and which type of fiber spinning technique is used. When the long period spinning techniques disclosed herein are used, the PMD of the fibers with long beatlength can be dramatically reduced. However, when applying the same technique to fibers with shorter beatlength (for example, a fiber of beatlength of 1 meter), the PMD reduction can be much less effective. FIG. 1 and FIG. 2 illustrate the effect of spin period on two fibers, one having a beat length of about 1 meter and the other having a beat length of about 10 meters. In both FIG. 1 and FIG. 2, the spin magnitude was 2.5 revolutions/m. While beat lengths of approximately 1 meter were common in what was considered good quality optical fiber even 5 years ago, today's manufacturing processes have enabled routine, consistent achievement of optical fibers having beat lengths greater than 10 meters or more. FIGS. 1 and 2 illustrate that, surprisingly, the long period spinning technique does not achieve the same amount of PMD reduction for fibers having shorter beat length. Instead, whereas the long period spinning techniques have an extremely beneficial effect on PMD for high beat length fibers, they in fact are much less effective on fibers having a smaller beat length (e.g. less than 5 meters). FIGS. 1 and 2 illustrate the PMD reduction factor vs. spin period for two fibers having different beat lengths. Both FIG. 1 and FIG. 2 illustrate results obtained using long period sinusoidal spin (rate) profiles, which take the form of, $$\alpha(z) = \alpha_0 \cdot \cos\left(\frac{2\pi z}{\Lambda}\right) \qquad (6)$$

where $\alpha_0$ is the spin magnitude, in revolutions/m, and $\Lambda$ is the spin period in meters. A sinusoidal spin profile with 20 meters period is illustrated in FIG. 3. As can be seen in FIG. 1, for fibers having low beat lengths, increasing the period of the spin can actually have a deleterious effect on the ability of the spin to reduce the PMD in the fiber. On the other hand, as can be seen in FIG. 2, a fiber having a beat length of about 10 meters clearly shows improved PMD reduction with longer spin periods. Consequently, whereas most routine spinning techniques employed in manufacturing processes for optical fiber have typically included small spin periods (e.g. less than 5 meters), applicants invention employs a longer period to effectively reduce PMD of fibers having longer beatlengths.

Figure 4:
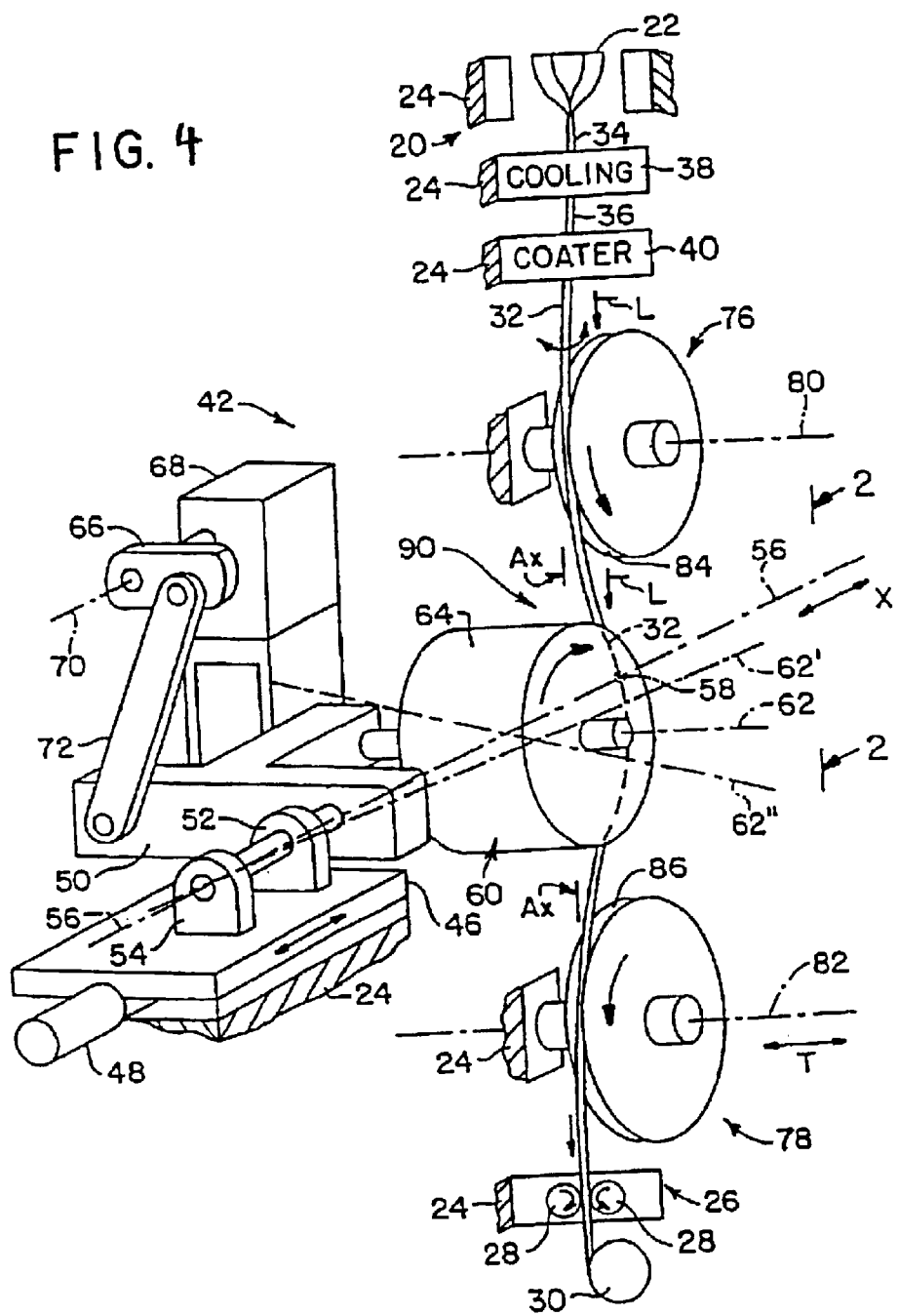
FIG. 4 is an illustration of a fiber spinning apparatus which may be employed to carry out the methods of the present invention.

Any apparatus which is capable of spinning the fiber during the fiber drawing process and is also capable of varying the frequency and/or amplitude of the spin may be used to carry out the methods of the present invention. FIG. 4 illustrates such an apparatus which is capable of producing the spin functions disclosed herein to impart the desired spin to the optical fiber. Referring to FIG. 4, furnace 20 is adapted to hold a preform 22 of the type commonly utilized in optical fiber drawing procedures. Furnace 20 is mounted to a frame 24 which defines the fixed frame of reference of the drawing system. Frame 24, for example, may be the frame of a building in which the fiber drawing operation is conducted. A takeoff or pulling stand 26 having a pair of opposed draw rollers 28 is provided downstream of furnace 20. Stand 26 includes conventional elements (not shown) as such electromechanical drive systems for turning rollers 28 about their axes so as to draw a fiber engaged therebetween. A takeup reel 30 is also provided. The takeup reel is also driven by conventional equipment (not shown) in rotation about an axis fixed relative to frame 24 so as to wind fiber from stand 26 onto the reel. Furnace 20 is arranged to maintain at least a portion of preform 22 in a soft, substantially molten condition. Stand 26 is arranged to pull a fiber 32 from the molten portion of preform 22 so that the fiber passes along a substantially predetermined path.

In a melt zone 34 adjacent the upstream end of the path, the fiber is substantially molten. However, as the fiber moves downstream along the path, it is cooled and solidified so that when the fiber reaches a point 36 considerably downstream from furnace 20, the fiber has cooled to a substantially solid state. The region of the path extending from point 36 to the downstream end of the path is referred to herein as the "solid region" of the path. Cooling devices 38 may be provided between the melt zone and the solid zone. Desirably, the cooling device provides non-contact cooling, such that no solid object touches the surface of the fiber while it cools.

A coating device 40 is also mounted to frame 24 in solid zone 36. The coating device is adapted to apply a polymeric coating on the outside of the fiber. Preferably, the coating device is also a non-contact device. That is, the fiber passes through coater 40 without contacting or engaging any other solid object. Suitable non-contact coaters are disclosed, for example, in U.S. Pat. No. 4,792,347. The foregoing elements of the apparatus may be of conventional design as commonly utilized in the optical fiber drawing art. The apparatus may further include additional guide rollers (not shown) adjacent to downstream end of path 32, for diverting the fiber and hence the path from a straight line and for further constraining the fiber in the path. Other conventional elements such as quality testing equipment and the like may also be included.

The spin-forming apparatus includes an adjustable carriage 4 slidably mounted to frame 24 for movement in cross-path directions X transverse to the longitudinal direction of path 32. A micrometer adjustment device 48 is provided for moving the carriage in the cross-path directions and for locking the carriage in place once the same has been adjusted to the desired location relative to frame 24. A yoke 50 is mounted to carriage 46 by a shaft 52 and bearings 54 so that yoke 50 is pivotable relative to carriage 46 and hence relative to frame 24 about a rocking axis 56 extending in the cross-path directions X and intersecting path 32 at a point of intersection 58.

Spin-imparting assembly 42 further includes a cylindrical first roller 60 mounted to yoke 50 for rotation about a first element axis 62. Roller 60 has a circumferential surface 64 encircling first element axis 62 and coaxial therewith. The frame of a motor 68 is mounted to carriage 46. A crank 66 is supported on the shaft of motor 68 so that the motor can turn crank 66 around an axis 70 parallel to the rocking axis 56. A connecting rod 72 has one end pivotally connected to crank 66 remote from its axis 70 and has the opposite end pivotally connected to yoke 50 remote from rocking axis 56. Thus, rotation of crank 66 about crank axis 70 will drive yoke 50 in a rocking motion about rocking axis 56 between a first extreme position in which the roller axis or first element axis 62 is tilted to the position indicated in broken lines at 62' in FIG. 1 and a second extreme position in which the roller axis or first element axis 62 is tilted in the opposite direction to the position shown in broken lines at 62" in FIG. 1. As best seen in FIG. 2, extreme positions 62' and 62" are disposed at equal but opposite extreme tilt angles E1 and E2 from a nominal position 62 in which the roller axis or first element axis is perpendicular to the longitudinal direction of path 32. In all positions of the roller including these extreme positions, however, the roller axis 62 remains generally transverse to the longitudinal direction of the path. Desirably, each extreme angle E is between about 2 and about 10 degrees from nominal position. As further, discussed below, the desired angle depends upon the desired amount of spin to be imparted to the fiber. The angles E may be adjusted by adjusting the dimension of crank 66 and particularly, the spacing between the pin joint of connection rod 72 and axis 70. The speed of rotation of motor 68 determines the rate at which the yoke 50 and first element 60 will rock between the two extreme positions. Motor 68 may be an adjustable speed device such as a stepper motor driven by a digital control system of the conventional type, a DC motor driven by an adjustable voltage source, an air motor driven by an adjustable gas source, or any other conventional variable-speed motor. Alternatively, motor 68 may be fixed-speed device. Such spinning devices are further described in U.S. Pat. No. 6,324,872, the specification of which is hereby incorporated by reference.

Apparatus other than that shown in FIG. 4 can be used in the practice of the invention. See, for example, U.S. Pat. No. 4,509,968, which describes apparatus for rotating a fiber about its axis as it is being formed, as well as U.S. Pat. Nos. 5,298,047; 5,897,680; 5,704,960; and 5,943,466. In general terms, the spinning apparatus typically will include fiber-contacting means for applying a spinning force to a fiber, e.g. , a roller, and drive means for moving the fiber-contacting means in a non-sinusoidal spatial pattern as a function of time, e.g. , a computer-controlled drive motor and associated mechanical linkage for defining the motion of the fiber-contacting means.

Additional mechanisms for practicing the methods of the invention will be evident to persons skilled in the art from the disclosure herein, e.g. , mechanisms for sinusoidal or non-sinusoidal spinning of a preform, when such preform spinning is used alone or in combination with applying a spinning force to a fiber.

The spin periods employed herein are preferably at least 10 meters, more preferably at least 20 meters, even more preferably at least 50 meters, although applicants believe that the upper limit to the period in which the spin can take place is not limited, and thus, the spin period could be as long as 100 meters or more. This is evident from FIG. 2 where the PMD reduction factor is plotted against spin period. Although the PMD reduction factor sensitively depends on the value of spin period, the overall trend is that the PMD reduction factor decreases when spin period is increased. The local maximum values of PMD reduction factor provide a worst case judgment of PMD reduction performance. It is found from FIG. 2, even for a spin magnitude of 2.5 revolutions/m, the PMD value with long period spinning can be improved by around a factor of 10 and better when spin period is greater than 20.0 meters.

Figure 5:
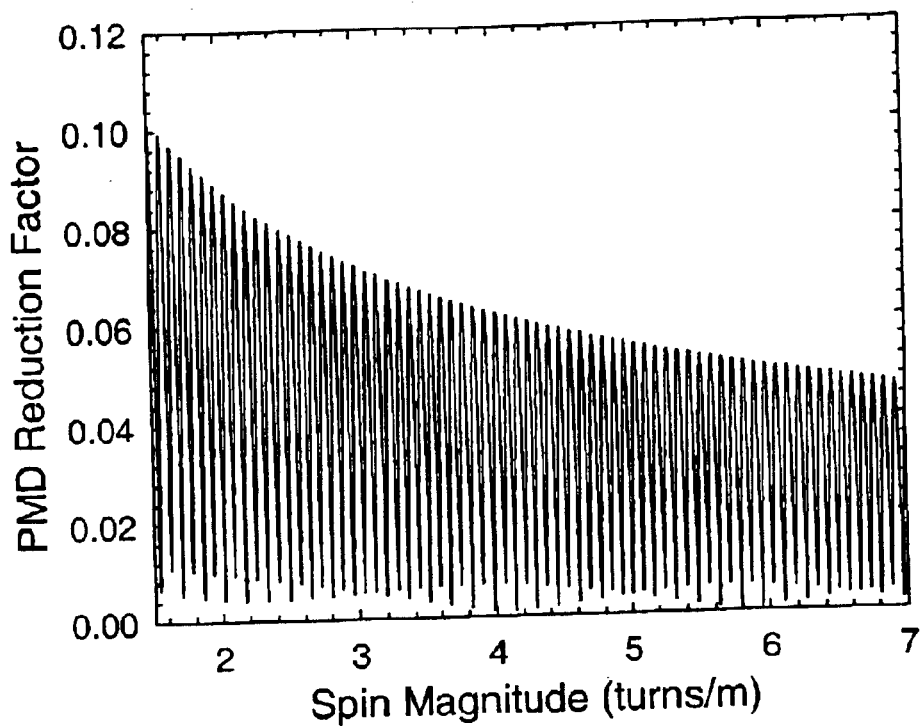
FIG. 5 illustrates PMD reduction factor as a function of spin magnitude for a fixed spin period of 20 m, for a fiber having a beatlength of 20.0 m.
Figure 6:
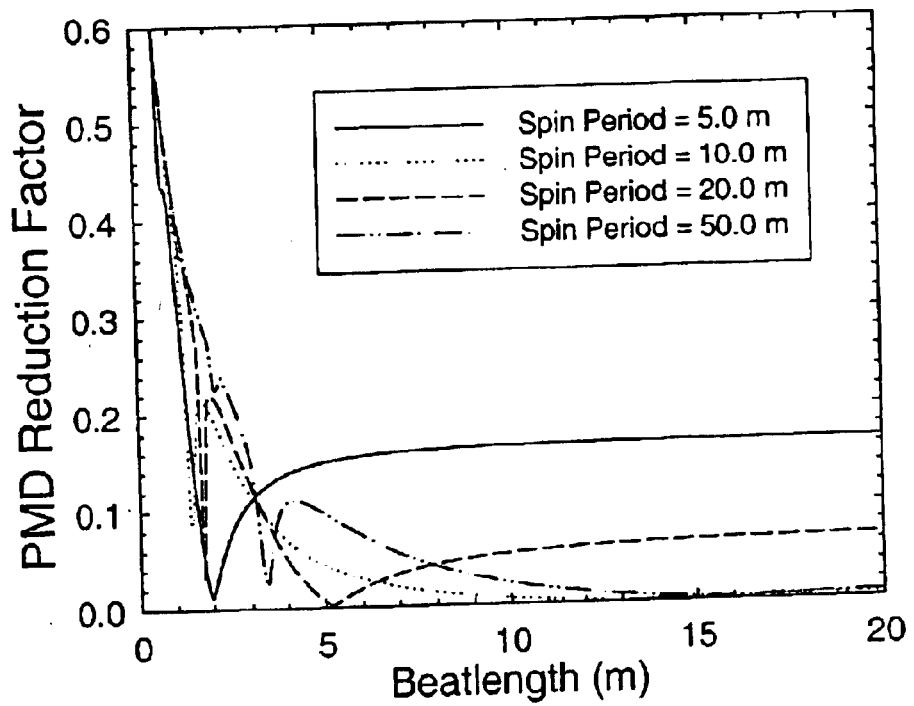
FIG. 6 illustrates the PMD reduction factor as a function of fiber beatlength for spin periods of 5 m, 10 m, 20 m and 50 m at a fixed spin magnitude of 2.0 revolutions/m.

The PMD reduction using long period spinning is also insensitive to typical process variation. Typical process related variations include the variation of spin magnitude during the fiber drawing process, and some fluctuation of fiber beatlength along the fiber. Because the fiber spin is enforced by the friction force between the running fiber and the wobble wheel, the amount of spin and resulting spin magnitude suffer from some inevitable fluctuations. This variation can at times be as large as ±0.5 revolutions/m. FIG. 5 illustrates PMD reduction factor as a function of spin magnitude for a fixed spin period of 20.0 m, and shows that at longer spin periods, PMD reduction factor is low for a wide variety of spin magnitudes, particularly at spin magnitudes greater than 1.5 revolutions/m. For a spin period of 20 meters, better than a factor of 10 improvement of fiber PMD can be achieved for spin magnitude larger than 1.5 revolutions/m. Another process variation that can effect PMD reduction is the fiber beatlength fluctuations. FIG. 6 illustrates PMD reduction as a function of beatlength for different spin periods at a fixed spin magnitude (2 revolutions/m), and shows that PMD reduction is beatlength dependent. For PMD reduction, beatlength dependence is not an issue as long as the PMD reduction factors are sufficiently low. Consequently, excellent PMD reduction can be achieved using the long period spinning techniques disclosed herein, even for fiber beatlengths greater than 5 meters.

Figure 7:
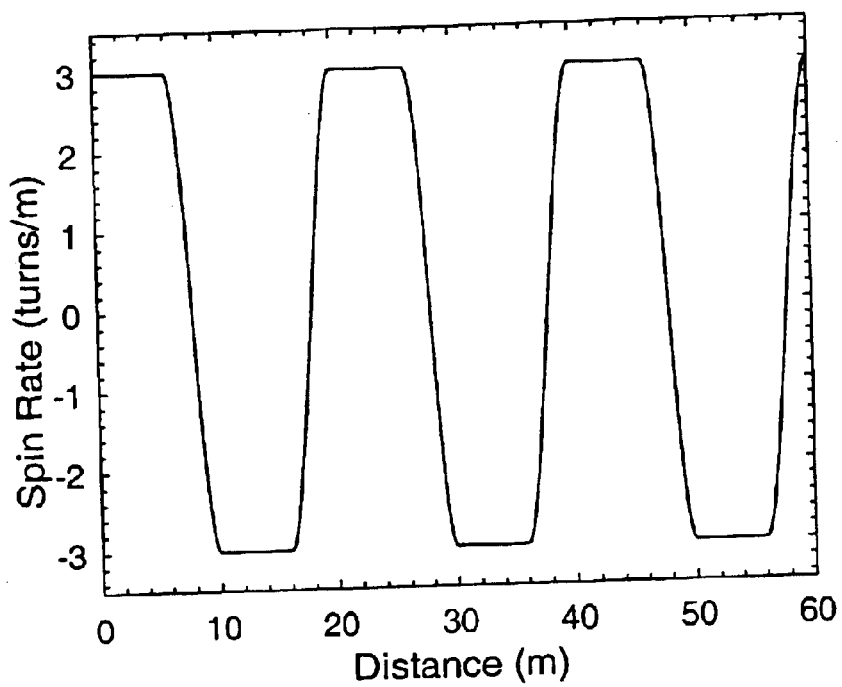
FIG. 7 illustrates the spin rate as a function of distance for a trapezoidal spin profile having a spin magnitude of 3.0 revolutions/m, and a spin period of 20.0 m.
Figure 8:
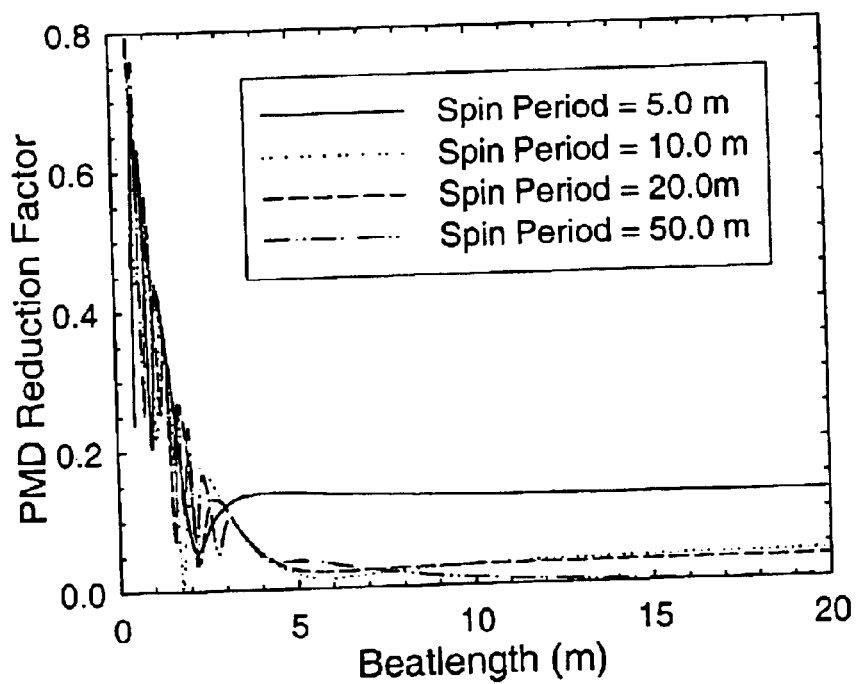
FIG. 8 illustrates the PMD reduction factor as a function of fiber beatlength for trapezoidal spin profiles having a spin period of 5 m, 10 m, 20 m, 50 m, and a spin magnitude of 3.0 revolutions/m.

The long-period spin profiles employed herein to impart the long period spin can be of any periodic shape. Preferably, the spin profile employed to impart the long period spin is of a periodic shape wherein the fiber is spun first clockwise and then counter-clockwise. The periodic spin profile is also preferably a symmetric spin profile, wherein the magnitude of the maximum spin rate in the counter-clockwise direction is at least substantially equal to the magnitude of the spin rate of the fiber when spun in the clockwise direction. The shape of the periodic spin profile could be any shape, including but not limited to sinusoidal, triangular, trapezoidal or other periodic spin functions with similar or longer spin periods. The most preferred spin profile employed herein is a sinusoidal spin profile which is symmetric in the magnitude of the spin rate of the clockwise and counter-clockwise directions. However, other spin profiles could be employed, as the PMD reduction performance should be similar for other spinning profiles. FIG. 7 shows a typical form of a trapezoidal spin profile. FIG. 8 illustrates PMD reduction factor as a function of fiber beatlength for several spin periods at a fixed spin magnitude of 3.0 revolutions/m, and shows that good PMD reduction performance can be achieved for spin period longer than 10 meters.

As mentioned above, the spinning methods disclosed herein are particularly advantageous for optical fibers having long beatlengths. One preferred manufacturing method for making such fibers having long beatlengths is via the outside vapor deposition (OVD) technique. In the outside vapor deposition process, core layers are deposited onto a cylindrical substrate. The central core region is typically first deposited onto a bait rod or mandrel, and the bait rod or mandrel is removed after the soot has been built up to a sufficient thickness to form the central core region. This central core region is then consolidated into a solid glass body, and the centerline hole which was formed by removing the mandrel is closed. For example, the hole may be closed by drawing the consolidated soot core preform into a smaller diameter core cane, thereby closing the hole. The central core region core cane is then used as a substrate for the additional core segment layers, if any are desired. In a preferred embodiment, additional soot layers are deposited to form a segmented core profile having three or more core refractive index regions. In a preferred embodiment, the core refractive index profile has at least three regions, the central region having refractive index $\Delta 1$, surrounded by a first annular region having refractive index $\Delta 2$, and the second annular region surrounding the first annular region having refractive index $\Delta 3$. Preferably, prior to the deposition of each soot region, the prior core region has been consolidated and redrawn to form a core cane. Such a process, wherein the various core regions are consolidated and redrawn to a narrower core cane prior to having additional soot regions deposited, assists with forming a long beatlength fiber. In addition, because the mandrel that is employed in the initial soot deposition process used to form the central core region is relatively small, the resultant hole that must be closed in the central core region is relatively smaller than may be the case with some other deposition processes (e.g. MCVD). Consequently, OVD in particular is a preferred technique for depositing the soot needed to form the optical fiber preforms used herein. However, the invention is certainly not limited to such preforms, and other methods of deposition may also be employed, such as, for example, MCVD, PCVD, and especially VAD.

EXAMPLES

The invention will be further illustrated by the following examples, which are meant to be exemplary, and not limiting, to the invention.

Example 1

Figure 9:
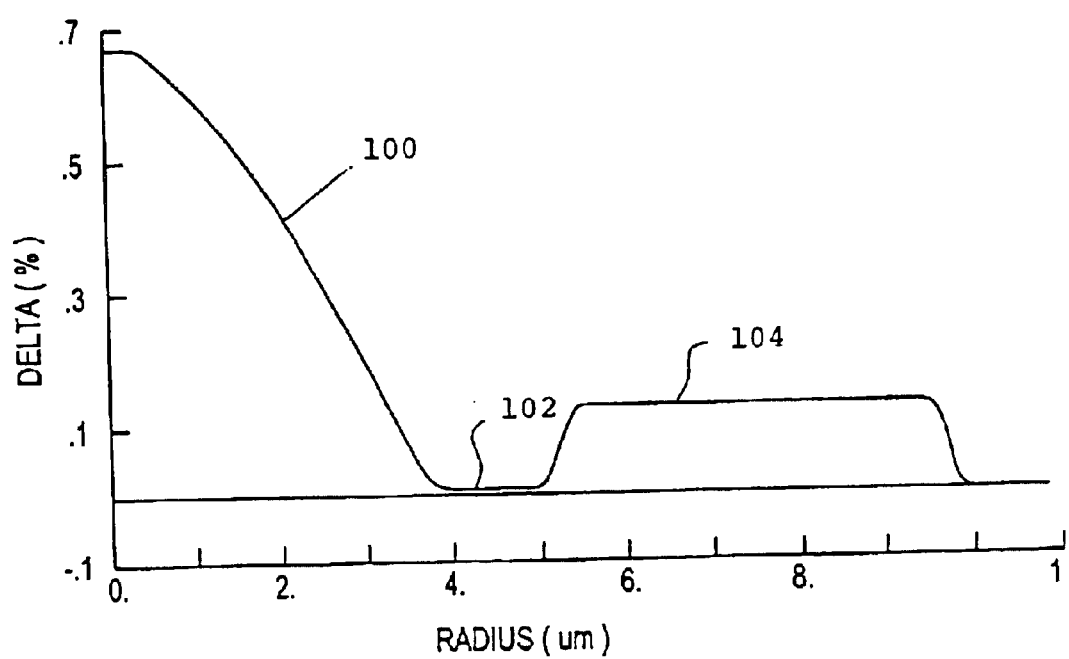
FIG. 9 illustrates a refractive index profile for an NZDSF fiber.

LEAF® optical fiber, a large effective area, non-zero dispersion shifted single-mode optical fiber was manufactured in accordance with a typical fiber draw process, in which an optical fiber preform was first made, and then heated to a temperature at which fiber could be drawn therefrom. It is typical for LEAF® fiber to exhibit a beatlength. For comparison purposes, the same fibers were drawn in both a spun and unspun state, as well as using a variety of spin periods. The birefringence properties of the unspun and spun fibers that are used to calculate the PMD reduction factor ideally are assumed to be identical, and the beatlength of these NZDSF fibers was above 20 m. A section of unspun fibers was drawn, immediately followed by a section of spun fiber, and this pattern was repeated with the same or different spin conditions. LEAF optical fiber, which is commercially available from Corning Incorporated, has an effective area greater than 50, more preferably greater than 60, and most preferably greater than 70 $\mu m^2$. This fiber also has a zero dispersion wavelength which is greater than about 1340, and less than about 1520 nm (more preferably between about 1400 and 1500). This optical fiber also exhibits a slope less than 0.09 ps/km$^2$. The fiber employed a refractive index profile similar to that shown in FIG. 9. As can be seen in FIG. 9, the refractive index profile of the NZDSF fiber employed a three segment core, formed by doping the core regions with various amounts of germania. In particular, the core employed a central core region 100 having $\Delta 1$, a second core region 102 surrounding the first core region 100, having $\Delta 2$, and a third core region 104 having $\Delta 3$ and surrounding the second core region 102. However, the invention is not limited to these types of refractive index profiles, and a wide variety of refractive index profiles could be employed, particularly refractive index profiles having three segments wherein $\Delta 1 > \Delta 3 > \Delta 2$, as is the case with the refractive index profile illustrated in FIG. 8. In some cases, it may be desirable to dope the moat region 102 with fluorine to lower the refractive index to that below the cladding, which preferably is undoped silica. By employing different refractive index profiles, as is known in the art, fibers having dispersion slopes less than 0.07 and even more preferably less than 0.06 can be easily achieved, particularly using the three segment core structure wherein $\Delta 1 > \Delta 3 > \Delta 2$. Using the long period spinning techniques disclosed herein, the PMD of such fibers can be reduced as well as in the case of the LEAF® fiber illustrated in this example. Set forth below in Table 1 is a comparison of the LEAF® fiber's PMD in the unspun state, the spun state having a low spin period of 1.5 meters, and the spun state having a long spinning period (20 meters) in accordance with the present invention. The spin magnitude for the shorter period spinning is about 3.5 revolutions/m and for the long period spinning the spin magnitude was about 2.7 revolutions/m. The PMD values are in the units of $ps/km^{1/2}$. As can be seen from Table 1, using the long period spin techniques disclosed herein, average PMD values can be maintained below 0.01 $ps/km^{1/2}$ (compared to less than 0.02 $ps/km^{1/2}$ for short period spinning techniques for the same fiber) more preferably below 0.007 $ps/km^{1/2}$. PMD values below 0.005 $ps/km^{1/2}$ have been achieved on such LEAF® NZDSF fibers, using the techniques disclosed herein.

TABLE 1

|  | Unspun | Short Period | Long Period |
| --- | --- | --- | --- |
| Avg. PMD | 0.0302 | 0.0197 | 0.0063 |
| Median PMD | 0.0268 | 0.0184 | 0.0064 |
| Std. Dev. | 0.0195 | 0.0102 | 0.0023 |
| N | 16 | 10 | 13 |

After the fibers were drawn, several one kilometer samples of each were collected on a 30 cm diameter measurement spool with zero winding tension. The large diameter and low winding tension are chosen to reduce the bending induced fiber birefringence or PMD and external perturbation. The differential group delay (DGD) are further measured using polarization analyzer made by Hewlett Packard of model HP8509, which is based on the mechanism called Jones Matrix eigenanalysis to get the DGD and PMD value of the fiber under test,) Table 2 sets for the PMD reduction factor for the standard low period spinning technique vs. the long period spinning technique in accordance with the present invention. As can be seen in both Tables 1 and 2, the long period spinning techniques used in accordance with the present invention achieved significantly better PMD reduction on this NZDSF fiber product. As far as applicants are aware, this is the first time a PMD on such an NZDSF fiber product, which employs a segmented core refractive index profile having three segments of $\Delta 1$, $\Delta 2$, and $\Delta 3$, wherein $\Delta 1 > \Delta 3 > \Delta 2$, has been made wherein the spun fiber PMD has been lowered to less than 0.01 $ps/km^{1/2}$.

TABLE 2

|  | Short Period | Long Period |
| --- | --- | --- |
| Avg. PMDRF | 0.8824 | 0.2996 |
| Median | 0.6182 | 0.2206 |
| Std. Dev. | 0.6581 | 0.2505 |
| N | 28 | 36 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A method of making an optical fiber comprising:

heating at least a portion of an optical fiber preform; and drawing optical fiber from the heated preform such that a spin is impressed on the fiber by applying a torque to the fiber, said torque causing the fiber to undergo rotation around longitudinal axis of the fiber such that the spin is impressed on the fiber as it is drawn from the preform, wherein the optical fiber has a beat length greater than about 5 meters, and at least a portion of the spin impressed on the fiber is alternately clockwise and counter-clockwise, with a spin repeat distance of at least 10 meters.

2. The method according to claim 1, wherein the spin repeat distance is greater than 20 meters.

3. The method according to claim 1, further comprising, prior to said heating step, forming said optical fiber preform by a process which comprises depositing multiple layers of silica soot so that the core region of said preform comprises a central region, a first annular region surrounding the central region, and a second annular surrounding the first annular region, wherein the refractive index of those respective regions is $\Delta 1$, $\Delta 2$, and $\Delta 3$, and $\Delta 1 > \Delta 3 > \Delta 2$.

4. The method of claim 3, wherein said layers are deposited using a process in which silica based soot is deposited onto the outside of a cylindrical substrate.

5. The method of claim 4, wherein at least one of said cylindrical substrates is a glass core cane.

6. The method according to claim 1, wherein the spin impressed on the fiber comprises a sinusoidal shape.

7. The method according to claim 1, wherein the spin impressed on the fiber is symmetric between the peak spin rate imparted in the clockwise direction and the peak spin rate imparted in the counter-clockwise direction.

8. The method according to claim 1, wherein the spin impressed on the fiber is asymmetric between the peak spin rate imparted in the clockwise direction and the peak spin rate imparted in the counter-clockwise direction.

9. The method according claim 1, wherein the spin repeat distance is greater than 30 meters.

* * * * *